(12) United States Patent
Jha et al.

(10) Patent No.: US 7,418,031 B2
(45) Date of Patent: Aug. 26, 2008

(54) AUTOMATIC BAUD RATE DETERMINATION

(75) Inventors: Mithilesh Kumar Jha, Laxminagar (IN); Juhee Mala, Rohini (IN)

(73) Assignee: STMicroelectronics PVT. Ltd., Uttar Pradesh (IN)

( * ) Notice: Subject to any disclaimer, the term of this patent is extended or adjusted under 35 U.S.C. 154(b) by 667 days.

(21) Appl. No.: 10/636,325

(22) Filed: Aug. 6, 2003

(65) Prior Publication Data

US 2005/0041594 A1 Feb. 24, 2005

(51) Int. Cl.
*H04B 3/46* (2006.01)
*H04B 17/00* (2006.01)
*H04Q 1/20* (2006.01)

(52) U.S. Cl. .................. 375/225; 370/232; 370/233; 370/252

(58) Field of Classification Search .................. 375/225; 370/252, 232, 233
See application file for complete search history.

(56) References Cited

U.S. PATENT DOCUMENTS

| 5,612,961 | A | | 3/1997 | Cabezas et al. |
| 5,627,858 | A | * | 5/1997 | Mak et al. .................... 375/225 |
| 5,694,399 | A | * | 12/1997 | Jacobson et al. ............ 709/246 |
| 6,944,248 | B2 | * | 9/2005 | Sullivan ..................... 375/369 |
| 6,959,014 | B2 | * | 10/2005 | Pohlmeyer et al. .......... 370/514 |

* cited by examiner

*Primary Examiner*—Ted Wang
(74) *Attorney, Agent, or Firm*—Hogan & Hartson LLP

(57) ABSTRACT

The present invention provides an electronic device consisting of a Universal Asynchronous Receiver Transmitter (UART) having its transmit data output connected to a triggered timer and a computing means that computes the transmitted baud rate from the time measured by the timer for transmitting the known data byte.

8 Claims, 3 Drawing Sheets

AUTOMATIC BAUD RATE DETERMINATION

FIELD OF THE INVENTION

This invention relates to automatic determination of baud rate in serial asynchronous interface circuits. In particular, it relates to a device and method for providing automatic baud rate detection in an efficient manner.

BACKGROUND OF THE INVENTION

Data communications is an essential part of a large number of electronic systems today. One of the most common data communication methods utilizes asynchronous serial data transfers in which the data is transferred serially one bit at a time without the help of a synchronizing clock and without incorporating an embedded clock in the serial data stream. This mode of data communication is particularly common in applications based on microcontrollers. The rate at which the bits are transferred is termed the baud rate. The timing for transmitting and receiving the data, is supplied by "Baud rate generators" that are provided separately at both the transmitting and the receiving ends. Correct communication requires the transmission baud rate and reception baud rates to be matched reasonably closely. Component tolerances lead to variations in actual baud rates achieved. This variation makes it necessary to have a mechanism that can determine the baud rate automatically and provide suitable corrective action.

Existing solutions for providing automatic baud rate detection utilize considerable external hardware to achieve automatic baud rate determination. U.S. Pat. No. 5,612,961 for instance, utilises a second communication device to verify the baud rate on the basis of transmitting and than receiving the same data byte.

SUMMARY OF THE INVENTION

The object of this invention is to provide an electronic device that is capable of automatic baud rate detection using the transmission of only a single known data byte, without the need for complex external hardware.

To achieve this object, the invention provides an electronic device consisting of a Universal Asynchronous Receiver Transmitter (UART) having its transmit data output connected to a triggered timer and a computing means that computes the transmitted baud rate from the time measured by the timer for transmitting the known data byte.

Accordingly, the invention provides an electronic device providing asynchronous serial communication capability with efficient automatic baud rate detection, comprising:

a Universal Asynchronous Receiver Transmitter (UART), a triggered Timer with Input-capture capability having its trigger input connected to the Transmit Data Output of the UART, and a computation means for computing the baud rate from the time measured for transmitting at least one known data character.

The computation means is an embedded microcontroller containing firmware for computing the transmitted baud rate.

Another embodiment of the invention provides a microcontroller providing asynchronous serial communication capability with efficient automatic baud rate detection, comprising:

a Universal Asynchronous Receiver Transmitter (UART) peripheral, a peripheral Timer with Input-capture capability having its trigger input connected to the Receive Data input of the UART, and firmware for computing the received baud rate from the time measured for receiving at least one known data character.

The invention also provides a method for providing asynchronous serial communication capability with efficient automatic baud rate detection, comprising the steps of:

measuring the time for receiving at least one known data character, and computing the received baud rate from the measured time.

BRIEF DESCRIPTION OF THE DRAWINGS

The invention will now be described with reference to the accompanying drawings.

DETAILED DESCRIPTION

Figure 1A:
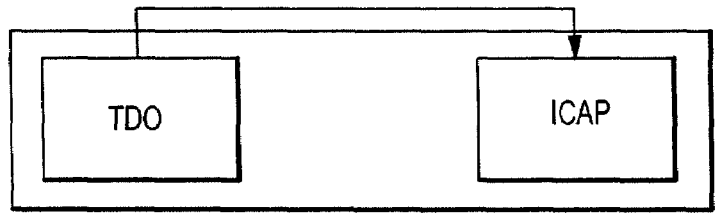
FIGS. 1(a)-(c) show preferred embodiments of the invention.

As shown in FIG. 1(a), a preferred embodiment of the invention comprises a general-purpose 8-Bit microcontroller, which includes an SCI (Serial Communication Interface) and a 16-Bit in-built timer as an on chip component. The TDO (Transmit Data Output) pin of the SCI is connected with Input Capture pin of the timer. A constant power supply of 5V constant output is used for driving the micro controller. The embedded firmware in the microcontroller includes the algorithm to capture an active edge on the data port and compute the actual transmission baud rate. The complete transmitted data byte frame consists of 10 bits, including eight data bits, one start and one stop bit. The time taken for transmitting the data byte is captured with the help of the Input Capture feature of the timer. This data is then used to compute the actual baud rate. The actual baud rate achieved can be further compared with the expected to determine any deviation.

Figure 1B:

A first embodiment of the invention is shown in FIG. 1(b) and includes a Universal Asynchronous Receiver Transmitter (UART) and a triggered Timer with Input-capture capability having its trigger input connected to the Transmit Data Output of the UART.

Figure 1C:
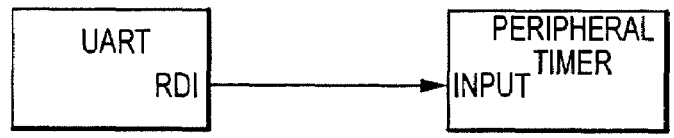

A second embodiment of the invention is shown in FIG. 1(c) and includes a Universal Asynchronous Receiver Transmitter (UART) peripheral and a peripheral Timer with Input-capture capability having its trigger input connected to the Receive Data input of the UART.

Figure 2:
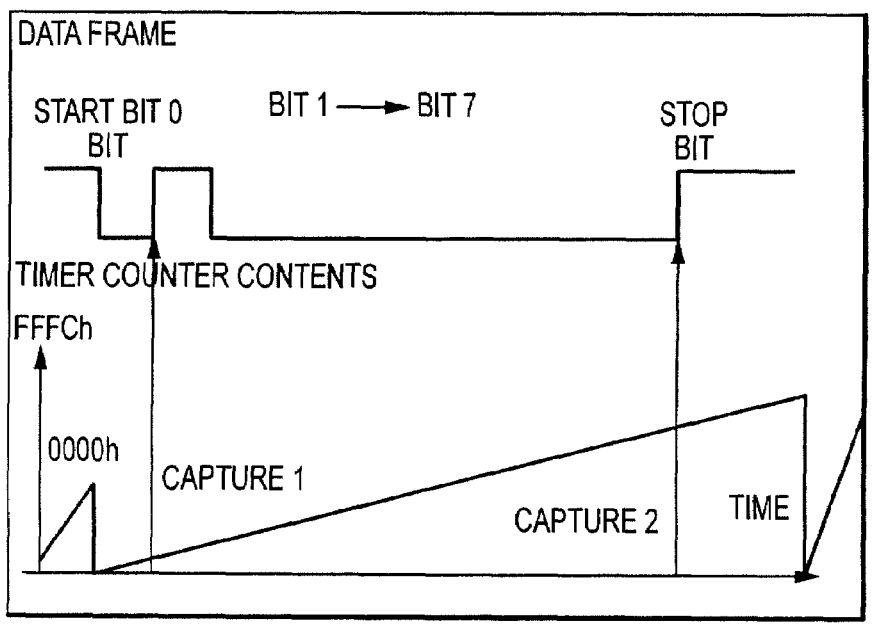
FIG. 2 shows an example of a known data byte used for the baud rate detection.

FIG. 2 shows one possible transmitted test data byte. The data byte of value "0x01" is received from the serial interface device at a baud rate 'x'. In this example, the LSB is received first. The timer is driven by a clock "fcpu/2" which is derived from the main CPU clock. The Timer Input capture feature is configured to capture the contents of the counter at the each rising edge (LSB) of the bit sequence. In this example, the timer therefore captures the rising edges corresponding to the first and last bits of the data. These data values are correlated with the fcpu (CPU Clock frequency) to compute the actual time delay in transmitting the complete bit sequence and then determining the actual baud rate of the device.

One of two possibilities may arise in the calculation of the captured elapsed time. If the Timer Counter does not overflow during the elapsed interval (as shown in FIG. 1), time is calculated simply as;

Capture Count=Capture2 time−Capture1 time

If, on the other hand, a counter overflow is generated then the time is given by Capture Counter=(((0xffff−capture1)+capture2)+1)

Timer Frequency=fcpu/2=Ftimer

Time Required for Transmitting the byte=Capture Counter/Timer Frequency=Tbyte

Figure 3:
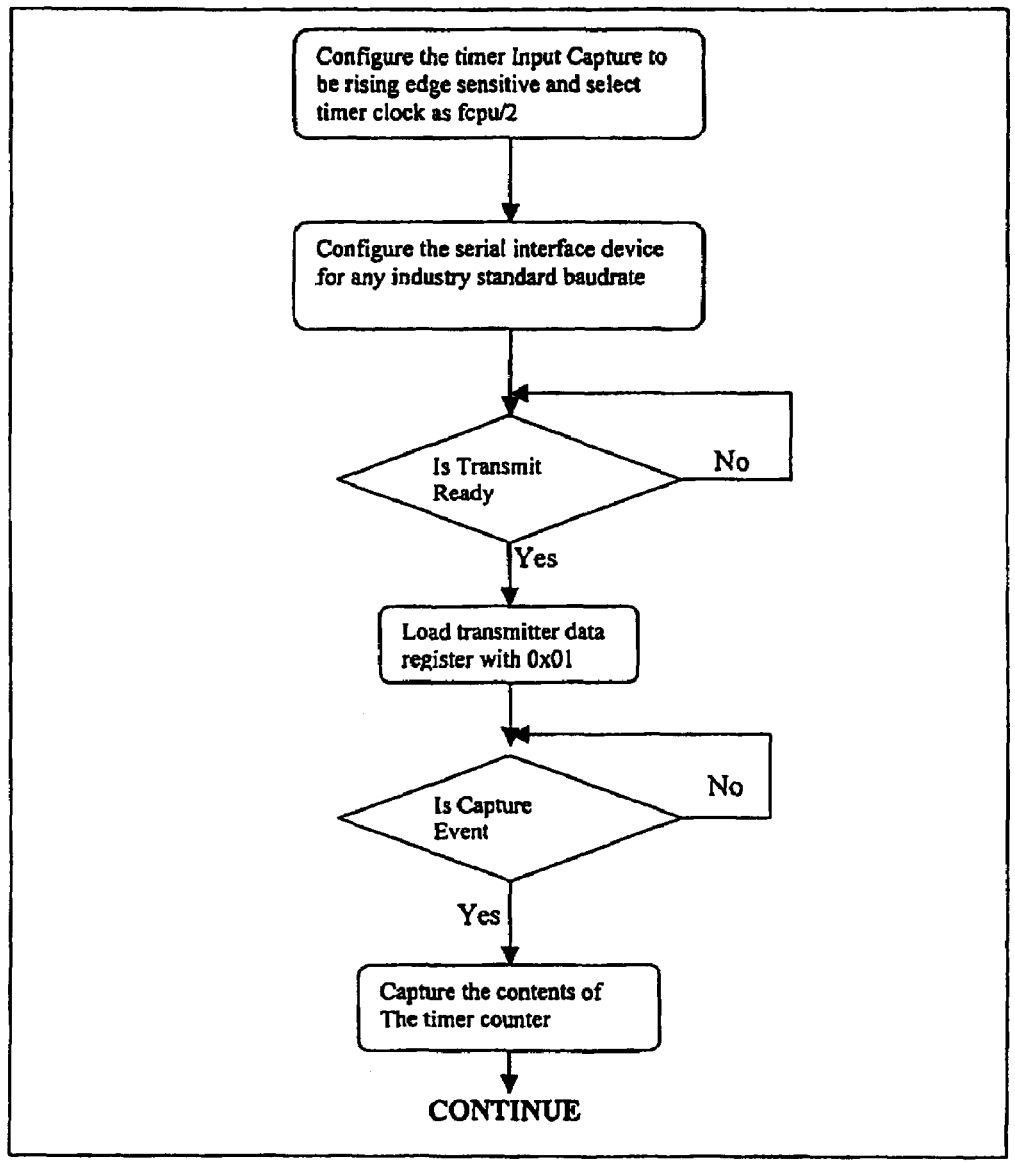
FIG. 3 shows a flow-chart of the preferred embodiment.
Figure 3:
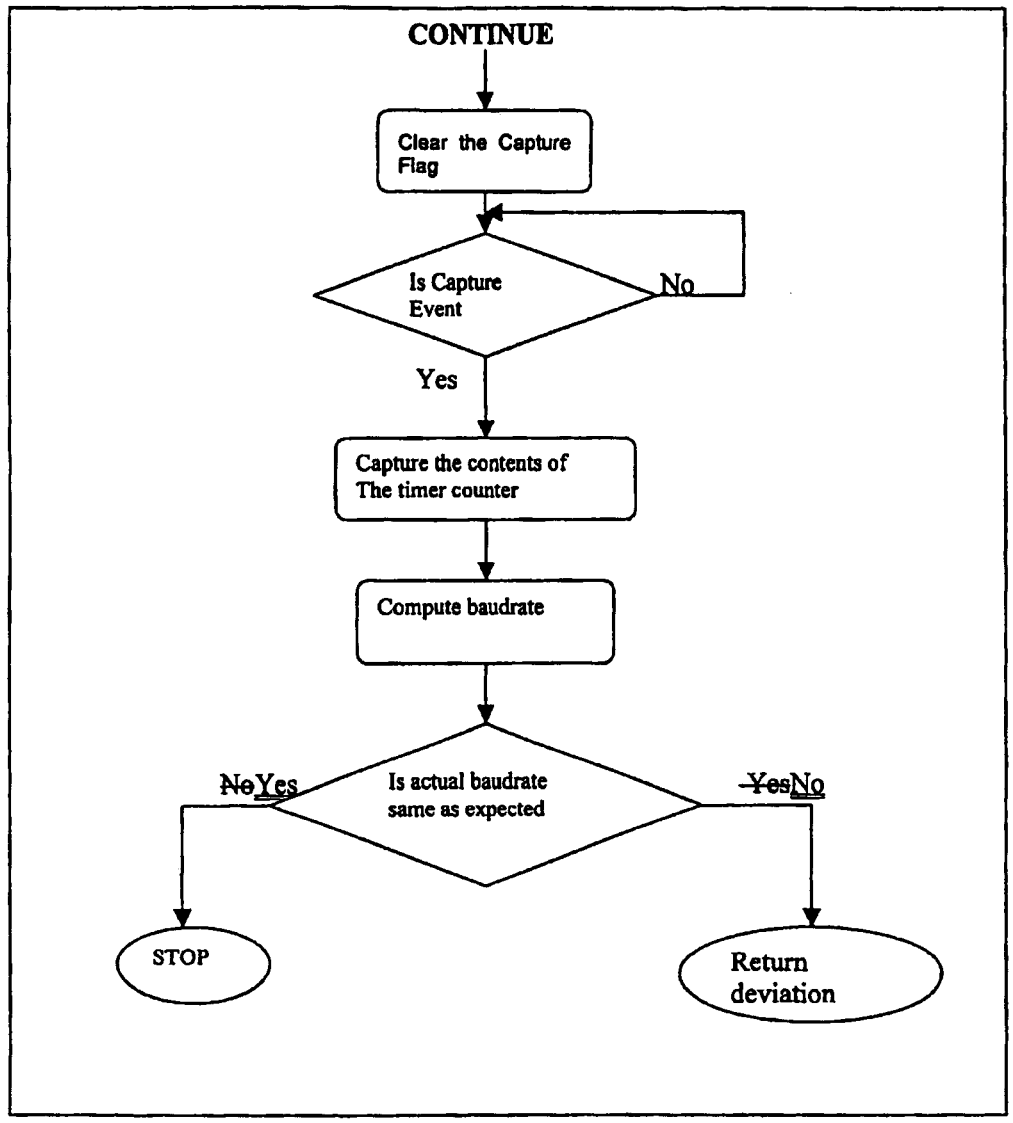

Time required for transmitting a single bit=Tbyte/No. of data bits in the frame=Tbit Actual baud rate=1/Tbit=Factual If the selected baud rate is Fselected, Deviation=Fselected−Factual FIG. 3 shows a flowchart describing the procedure for the measurement and determination of the actual baud rate as implemented on an ST72F63, an 8-Bit micro controller from ST Microelectronics comprising of SCI and Timer as on chip components. Serial Communication Interface (SCI) is configured at different possible baud rates (As given below in Table 1). Timer Input capture feature is configured as rising edge sensitive. Following mathematical data have been used.

CPU Clock=8 MHZ

Timer Clock=CPU Clock/2=4 MHZ

Number of bits per data frame=8

The actual results obtained experimentally in one particular case are as shown in Table 1.

TABLE 1

Actual Baud rate vs. Selected Baud rate

| Selected Baud Rate Bits/sec | Actual Baud Rate Bits/sec | Deviation % |
|---|---|---|
| 38400 | 38461 | 0.159 |
| 19200 | 19230 | 0.156 |
| 9600 | 9615 | 0.156 |
| 4800 | 4807 | 0.146 |
| 2400 | 2403 | 0.125 |
| 1200 | 1201 | 0.083 |
| 600 | 600 | 0.000 |

It will be apparent to those with ordinary skill in the art that the foregoing is merely illustrative and is not intended to be exhaustive or limiting, having been presented by way of example only and that various modifications can be made within the scope of the above invention.

Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

That which is claimed is:

1. An electronic device providing asynchronous serial communication capability with efficient automatic baud rate detection, comprising:
   a Universal Asynchronous Receiver Transmitter (UART),
   a triggered Timer with Input-capture capability having its trigger input directly connected to the Transmit Data Output of the UART, and
   a computation means for computing the baud rate from a time measured for transmitting at least one known data character.

2. An electronic device as claimed in claim 1 wherein the computation means is an embedded microcontroller containing firmware for computing the transmitted baud rate.

3. A microcontroller providing asynchronous serial communication capability with efficient automatic baud rate detection, comprising:
   a Universal Asynchronous Receiver Transmitter (UART) peripheral,
   a peripheral Timer with Input-capture capability having its trigger input directly connected to the Receive Data input of the UART, and
   firmware for computing the received baud rate from a time measured for receiving at least one known data character,
   wherein measuring the time for receiving the at least one known data character comprises capturing a first and a last rising edge of a bit sequence.

4. A method for providing asynchronous serial communication capability with efficient automatic baud rate detection, comprising the steps of:
   measuring the time for receiving at least one known data character,
   wherein measuring the time for receiving the at least one known data character comprises capturing a first and a last rising edge of a bit sequence, and
   computing the received baud rate from the measured time, wherein measuring the time for receiving at least one known data character comprises measuring the time with a peripheral or trigger timer directly connected to a receive data input of a Universal Asynchronous Receiver Transmitter (UART) peripheral.

5. The method of claim 4 wherein measuring the time for receiving at least one known data character comprises capturing each rising edge of a bit sequence.

6. The method of claim 4 wherein computing the received baud rate from the time measured comprises correlating the measured time with a CPU clock frequency to compute an actual time delay.

7. The method of claim 4 wherein computing the received baud rate from the time measured comprises computing the baud rate in firmware.

8. The method of claim 4 wherein computing the received baud rate from the time measured comprises computing the baud rate in a microcontroller.

* * * * *